(No Model.)  5 Sheets—Sheet 2.

W. ASHTON.
APPARATUS FOR REGISTERING THE POWER OF STEAM ENGINES, &c.

No. 348,147. Patented Aug. 24, 1886.

Witnesses,
George W. Rea
Robert Everett

Inventor,
William Ashton
By James L. Norris.
Atty.

(No Model.) 5 Sheets—Sheet 3.

W. ASHTON.
APPARATUS FOR REGISTERING THE POWER OF STEAM ENGINES, &c.

No. 348,147. Patented Aug. 24, 1886.

Witnesses,
George W. Rea.
Robert Everitt,

Inventor:
William Ashton,
By James L. Norris.
Atty.

(No Model.) 5 Sheets—Sheet 4.
W. ASHTON.
APPARATUS FOR REGISTERING THE POWER OF STEAM ENGINES, &c.
No. 348,147. Patented Aug. 24, 1886.
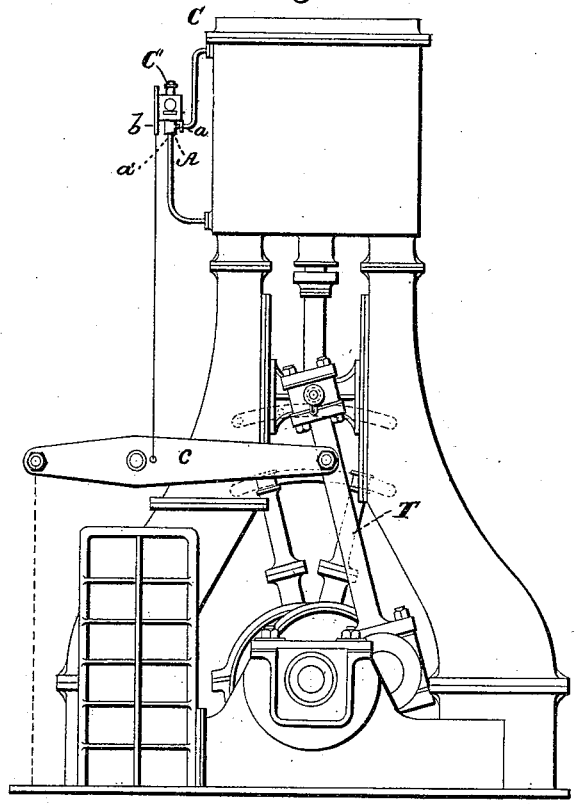
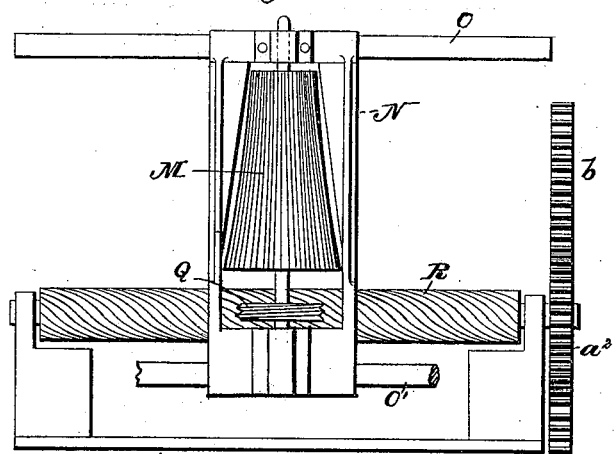
Witnesses
Dennis Sumby
Robert Everett
Inventor
William Ashton,
By James L. Norris
Atty.

(No Model.)   5 Sheets—Sheet 5.

W. ASHTON.
APPARATUS FOR REGISTERING THE POWER OF STEAM ENGINES, &c.

No. 348,147.   Patented Aug. 24, 1886.

Witnesses.
Dennis Sumby,
Robert Everett.

Inventor.
William Ashton
By James L. Norris.
Atty.

UNITED STATES PATENT OFFICE.

WILLIAM ASHTON, OF MANCHESTER, ASSIGNOR OF ONE-HALF TO ERNEST SCOTT, OF NEWCASTLE, ENGLAND.

APPARATUS FOR REGISTERING THE POWER OF STEAM-ENGINES, &c.

SPECIFICATION forming part of Letters Patent No. 348,147, dated August 24, 1886.

Application filed October 28, 1884. Renewed February 23, 1886. Serial No. 192,925. (No model.) Patented in England January 9, 1884, No. 1,049; in Belgium October 31, 1884, No. 66,626; in Italy December 6, 1884, No. 17,501; in Austria-Hungary December 31, 1884, No. 39,123 and No. 60,585; in France February 13, 1885, No. 164,746, and in Germany August 27, 1885, No. 32,683.

*To all whom it may concern:*

Be it known that I, WILLIAM ASHTON, a subject of the Queen of Great Britain, residing at Manchester, England, have invented new and useful Improvements in Power-Meters or Apparatus for Registering or Indicating the Power of Steam-Engines or for Similar Purposes, (for which I have obtained a patent in Great Britain, No. 1,049, bearing date January 9, 1884,) of which the following is a specification.

My invention relates to apparatus for registering or indicating the power of, or ascertaining the amount of work done by, steam-engines or for similar purposes.

Its chief object is to provide a simple and efficient steam-power meter or continuous steam-engine indicator. Parts of the apparatus, however, are applicable to a dynamometer or as a planimeter.

Figure 1:
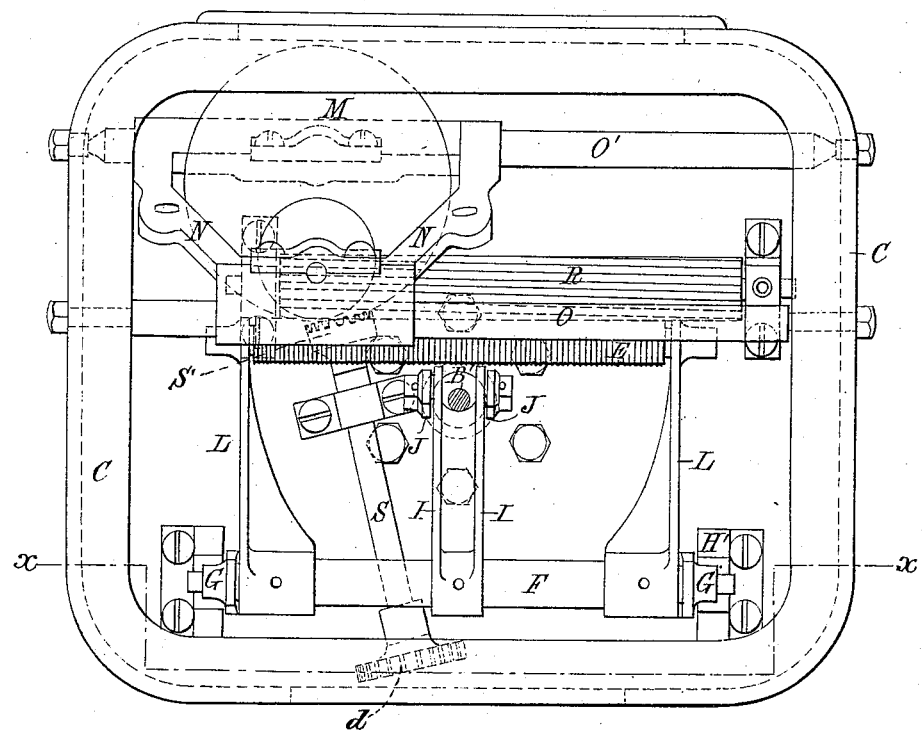
Figure 2:
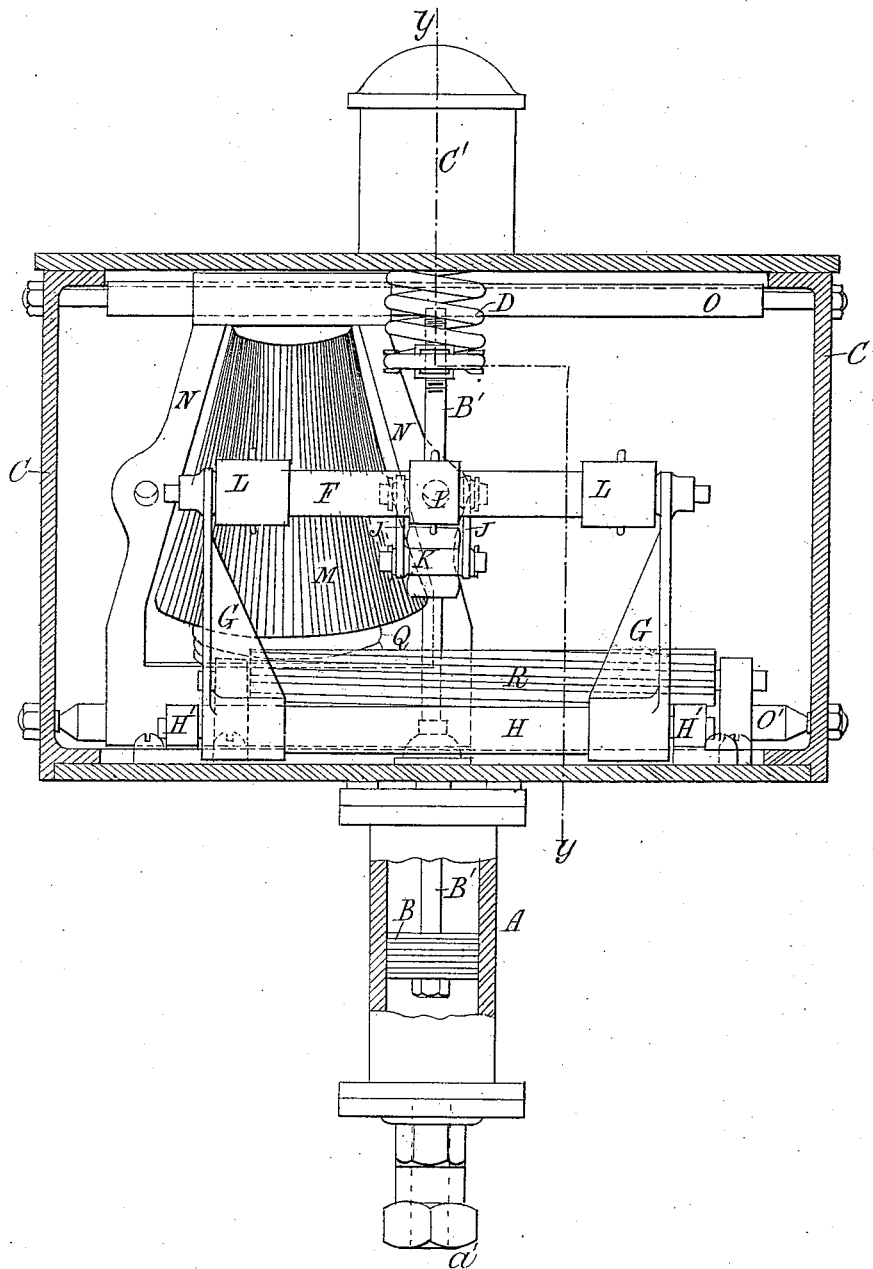
Figure 3:
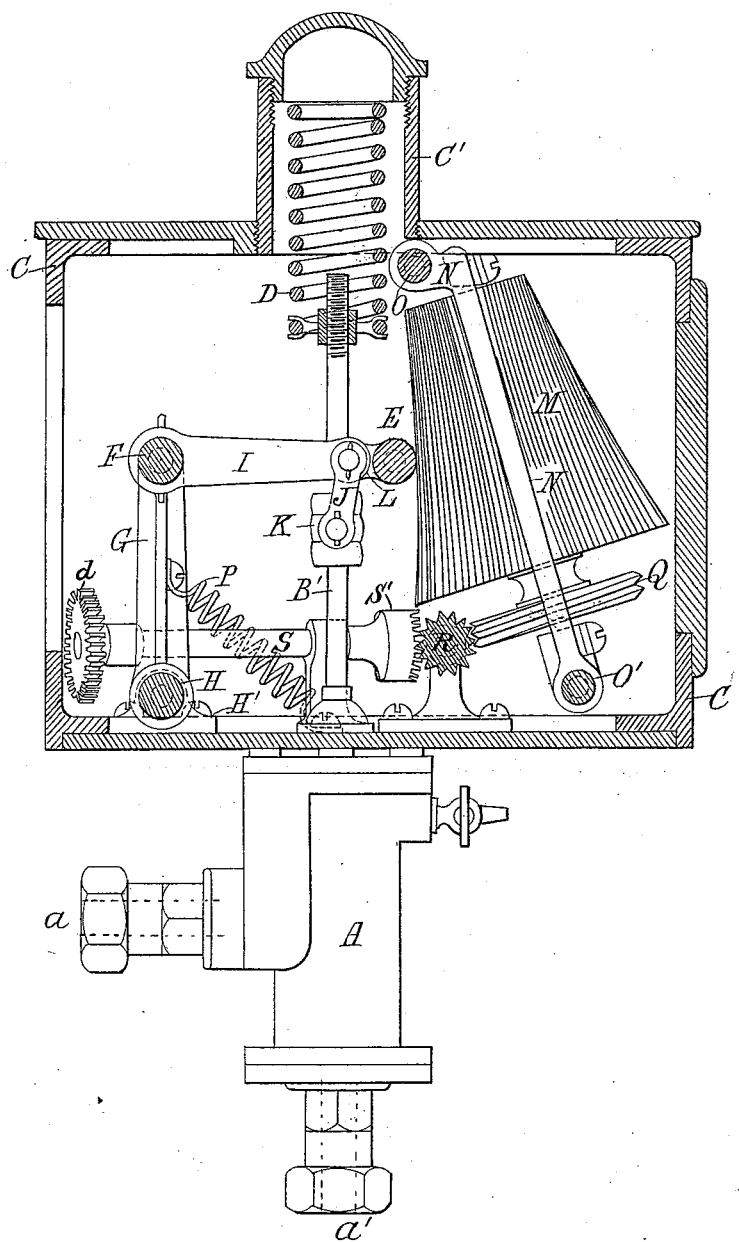
Figure 6:
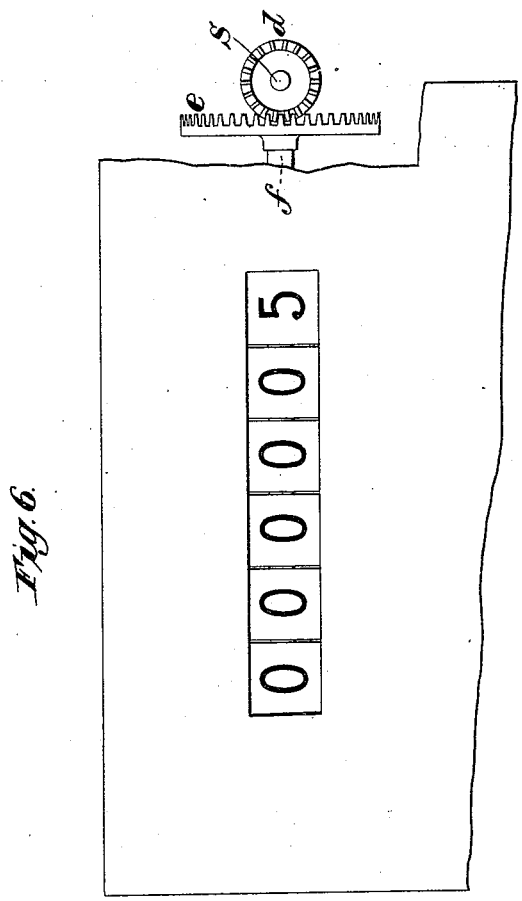

In the accompanying drawings, Figure 1 is a plan thereof with some of the parts removed. Fig. 2 is a section on the line $xx$, Fig. 1; and Fig. 3 is a section on the line $yy$, Fig. 2. Fig. 4 is a side elevation showing the power-meter applied to a marine engine. Figs. 5 and 6 are detail views.

A is a small double-acting cylinder designed to be connected at each end by one of the passages $a\ a'$ with the corresponding end of the steam-engine cylinder—that is to say, the upper end of the cylinder A is to be connected with the upper end of the steam-engine cylinder and the lower end thereof with the lower end of the steam-engine cylinder. B is a piston fitting within the said cylinder A, and provided with a piston-rod, B'. This piston-rod extends into a casing, C, and its motion is controlled or regulated by the action of a spring, D, which limits the range of movement of the piston B from the middle of the cylinder A in either direction to a distance proportional to the pressure on the said piston, and which is attached at one end to the casing C, or to a cap, C', screwed into the same.

A cylindrical roller, E, is connected to the piston-rod B' through the medium of the following parts, viz: A shaft, F, is carried by the links G, which are fixed upon the shaft H, carried in bearings in the brackets H'. A forked arm, I, is fixed upon the shaft F, and connected by the links J with the cross-head K, which is fixed on the piston-rod B'. Two longer arms, L, are also fixed on the shaft F, and carry between them the said cylindrical roller E; or the said roller is otherwise so connected with the piston-rod B' that it can move to and fro transversely to its axis in a plane at right angles to the axis of the piston-rod, but will remain parallel to one and the same straight line in that plane, and can also move in a line parallel, or nearly so, with the axis of the piston-rod, with a velocity bearing a fixed proportion to that of the said piston-rod. The surface of this roller is either covered with small teeth, similar to the teeth covering a cotton or wool carding cylinder, or it is corrugated or fluted with peripheral or circumferential grooves at right angles to its axis, or it is otherwise roughened, for the purpose hereinafter explained.

M is a conoidal drum or roller, the surface of which has the form of a solid generated by the revolution of a hyperbolic curve, or one-half of a hyperbola around or about one of its asymptotes. This drum or roller is carried in suitable bearings in a frame, N, which frame is fitted to slide upon the guide-bars O O'. These bars are parallel with each other and also with the axis of the roller E in any position which it can occupy. The surface of the conoidal drum M, like that of the roller E, is either covered with teeth or it is corrugated or fluted with grooves of the same or nearly the same pitch as those on the said roller, and extending longitudinally along the said drum; or it is otherwise roughened, to increase the friction between the said drum and the roller E. As the plane which passes through the axis of the conoidal drum M and its point of contact with the roller E is at right angles to the axis of the said roller, the grooves of this roller and those of the conoidal drum are parallel, or nearly so, and are equal at the said point of contact, and the said roller is, moreover, continually pressed against the said drum by the springs P acting upon the links G. The said roller and conoidal drum are therefore always in gear or in frictional contact with each other, and if the frame N, carrying the conoidal drum M, is moved to and fro along the guide-bars O O', rotary motion will be imparted to the said drum in a direction corresponding to the direction of such movement, and with a velocity dependent upon the position of the roller E relatively to the said drum. The frame N, carrying the conoidal drum, must be connected with the cross-head or other appropriate part of the steam-engine—for instance, the pitman T—as shown in Fig. 4, whereby reciprocating motion can be imparted to the said frame, so that it may carry the conoidal drum in contact with the roller E in one direction during the forward or advancing stroke of the engine-piston, and in the other direction during the return-stroke of the said piston, and in such a manner that its velocity will bear a constant ratio to that of the piston. When therefore the engine is not in action, the indicator-piston B will be at about the middle of its cylinder A, and the spring D, which controls or regulates its motion, will be in its normal state of rest, with the roller E in contact with the middle point of the conoidal drum, as shown, or nearly so.

The manner of connecting the drum with the pitman T is illustrated in Figs. 4 and 5. On reference to said figures it will be seen that a toothed wheel, $a^2$, is fixed on one end of the worm R, and gears with a rack, b, actuated by the lever or beam c of the engine. It is obvious therefore that the conoidal drum M will be reciprocated in proportion to the movement of the lever or beam c, and consequently in proportion to the stroke of the engine-piston. When steam is admitted on one side of the engine-piston, and consequently on the corresponding side of the indicator-piston, the latter is moved in its cylinder until the force tending to move it is balanced by the resistance of the spring D, the roller E being at the same time moved by the piston-rod B' along the surface of the drum M to a distance from the middle point thereof proportionate to the pressure of the steam on the piston. The said drum will at the same time be moved, together with the frame N, by the engine cross-head or other part to which it is connected, along the surface of the cylindrical roller E, in contact therewith. Rotary motion will therefore be imparted to the said drum, the velocity of rotation being dependent on the speed of the cross-head or other part of the engine and the position of the roller E relatively to the conoidal drum, or, in other words, on the speed of the engine-piston and the pressure of the steam thereon.

In order that the differences in the amount of angular motion imparted to the drum M may be proportionate to the corresponding differences in the pressure on the piston during a certain and constant amount of the movement of the said drum along the face of the cylindrical roller, the form of the said drum must be that of a solid generated by the revolution of a hyperbolic curve or one-half of a hyperbola around or about one of its asymptotes, as above stated. During the forward stroke of the engine-piston the drum M is moved, say, forward along the roller, and in gear or in frictional contact therewith, and, at the same time, the roller is held by the pressure of the steam, say, above the middle of the drum M, so that the said drum is rapidly rotated in one direction, while during the return-stroke of the engine-piston the conoidal drum is moved backward along the roller and in gear or in frictional contact therewith, and, at the same time, the roller is held by the pressure of the steam below the middle of the said drum, so that the latter is slowly rotated in the opposite direction, the difference between the angular motion of the drum in the forward and in the backward strokes of the engine-piston being strictly proportionate to the space traversed by the said piston multiplied by the pressure on the same. This difference is therefore strictly proportionate to the power developed by the engine during its double stroke, and this is true for every other stroke. A worm or endless screw, Q, is fixed on the spindle or axle of the drum M, and is geared with a long worm-pinion, R, carried in suitable bearings fixed to the casing. This pinion is connected with the annular toothed wheel S' on the end of the shaft S, and this shaft is connected by suitable gearing with the pointers and indices of any suitable registering or recording mechanism attached to the said casing.

The connection of registering mechanism with the shaft S is shown in Fig. 6, and is effected by means of a toothed wheel, d, fixed on the shaft S, and gearing with a crown-wheel, e, fixed on the shaft f of the registering mechanism. The registering mechanism shown is that known as "Harding's counter," and is described in the specification of Letters Patent of Great Britain, dated February 22, 1877, No. 739, and May 26, 1880, No. 2,151, and therefore not here described in detail. The teeth of the said pinion R have a slight twist given to them equal to the pitch of the said teeth in a length equal to the circumference of the middle portion of the said drum, so that when the roller E is bearing on the middle of the said drum no motion is communicated to the pinion R by any movement of the frame N, the threads of the endless screw Q merely traveling to and fro in the spaces between the teeth of the said pinion; but when the said roller is above the middle of the drum and the drum is moved forward along it, and thereby rapidly rotated in a forward direction, the said pinion R is at the same time rotated in a forward direction and operates the registering or recording mechanism accordingly. Moreover, when the roller is below the middle of the drum and the drum is carried backward along it, and thereby slowly rotated in a backward direction, the pinion R will be rotated also in a forward direction, as before, and the registering or recording mechanism will be operated accordingly, the record given by the indices during the advancing and return strokes of the piston being proportional to the work done by the engine. The middle of the drum M in effect corresponds with the zero-point of the registering or recording mechanism as well as with that of the steam-pressure.

It is obvious that my improved apparatus may be employed for measuring or registering the work done by other fluids, as well as that performed by steam.

What I claim is—

1. The combination of the rods O O', the frame N, sliding thereon, the revolving conoidal drum M, carried by said frame, the piston-rod B', the roller E, connected with the piston-rod and bearing against said drum, a register, and gearing connecting the drum with the register, substantially as and for the purpose described.

2. The combination, with the conoidal revolving and traveling drum M and the revolving roller E, connected with the piston-rod B', and bearing against the conoidal roller at right angles to its length, of an endless screw, Q, connected with the shaft of the conoidal roller, a worm-pinion, R, gearing with the endless screw, a register, and gearing connecting said register with pinion R, substantially as described.

3. The combination, with the piston B, piston-rod B', and spring D, of the traveling frame N, carrying the conoidal drum M, of the links G, spring P, acting thereon, shaft F, carried by said links, forked arm I, extending from said shaft, roller E, carried by said arm and bearing against said drum at right angles to its length, and links J, connecting said forked arm with the piston-rod, substantially as described.

4. The combination, with the traveling frame N, carrying the conoidal drum M and endless screw Q, and the piston-rod B', spring D, and roller E, connected with piston-rod B', and bearing against conoidal drum M at right angles to its length, of the worm R, meshing with endless screw Q, a register, and shaft S, having gears connecting the register and pinion R, substantially as described.

In testimony whereof I have hereunto set my hand in the presence of two subscribing witnesses.

WILLIAM ASHTON.

Witnesses:
 CHARLES F. HILDER,
 ROBINSON LOCKE.